United States Patent
Kronfeld et al.

(10) Patent No.: US 10,175,353 B2
(45) Date of Patent: Jan. 8, 2019

(54) ENHANCEMENT OF AIRBORNE WEATHER RADAR PERFORMANCE USING EXTERNAL WEATHER DATA

(71) Applicants: Kevin M. Kronfeld, Cedar Rapids, IA (US); Venkata A. Sishtla, Marion, IA (US); Roy E. Robertson, Marion, IA (US); Robert J. Richard, Annapolis, MD (US)

(72) Inventors: Kevin M. Kronfeld, Cedar Rapids, IA (US); Venkata A. Sishtla, Marion, IA (US); Roy E. Robertson, Marion, IA (US); Robert J. Richard, Annapolis, MD (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 553 days.

(21) Appl. No.: 14/863,241

(22) Filed: Sep. 23, 2015

(65) Prior Publication Data

US 2017/0082745 A1   Mar. 23, 2017

(51) Int. Cl.
*G01S 7/14* (2006.01)
*G01S 7/22* (2006.01)
(Continued)

(52) U.S. Cl.
CPC ............ *G01S 13/953* (2013.01); *G01S 7/003* (2013.01); *G01S 7/14* (2013.01); *G01S 7/22* (2013.01); *G01S 7/24* (2013.01); *Y02A 90/18* (2018.01)

(58) Field of Classification Search
CPC .......... G01S 13/953; G01S 7/003; G01S 7/14; G01S 7/22; G01S 7/24; G01S 7/20;
(Continued)

(56) References Cited

U.S. PATENT DOCUMENTS

| 6,043,756 A * | 3/2000 | Bateman ................. G01S 7/003 340/945 |
| 6,501,392 B2 * | 12/2002 | Gremmert ............... G01S 7/003 340/971 |

(Continued)

FOREIGN PATENT DOCUMENTS

| EP | 2237068 A1 * | 10/2010 | ............ G01S 13/953 |
| EP | 2821752 A1 * | 1/2015 | ............ G06F 3/0484 |

(Continued)

*Primary Examiner* — Peter M Bythrow
*Assistant Examiner* — Nuzhat Pervin
(74) *Attorney, Agent, or Firm* — Donna P. Suchy; Daniel M. Barbieri

(57) ABSTRACT

A weather radar control system includes a processor configured to acquire first weather data for a first area extending from an aircraft from a weather radar system onboard the aircraft. The first weather data includes a first location of a weather event in the first area. The processor is further configured to receive second weather data for a second area with respect to the aircraft via the communication system from an external location where the second weather data includes a second location of a weather event in the second area, and correlate the first weather data and the second weather data. The processor is further configured to generate display data for display based on the correlated weather data where the display data is for a display area at least partially defined by the first and second areas, and provide the display data to a display system onboard the aircraft.

20 Claims, 7 Drawing Sheets

(51) Int. Cl.
*G01S 7/24* (2006.01)
*G01S 13/95* (2006.01)
*G01S 7/00* (2006.01)

(58) Field of Classification Search
CPC .... Y02A 90/18; H04B 7/155; H04B 7/18506; B64D 43/00; G06F 3/0484
USPC ...................................................... 342/26 B
See application file for complete search history.

(56) References Cited

U.S. PATENT DOCUMENTS

| | | | | |
|---|---|---|---|---|
| 7,027,898 | B1* | 4/2006 | Leger | B64D 43/00 |
| | | | | 701/14 |
| 7,675,461 | B1* | 3/2010 | McCusker | G01S 7/20 |
| | | | | 342/179 |
| 7,982,658 | B2* | 7/2011 | Kauffman | G01S 13/953 |
| | | | | 342/26 B |
| 8,054,214 | B2* | 11/2011 | Bunch | G01S 7/003 |
| | | | | 342/26 R |
| 8,085,182 | B2* | 12/2011 | Kauffman | G01S 7/22 |
| | | | | 342/26 B |
| 9,535,158 | B1* | 1/2017 | Breiholz | G01S 13/953 |
| 9,599,707 | B1* | 3/2017 | Kronfeld | G01S 13/953 |
| 9,689,984 | B1* | 6/2017 | Breiholz | G01S 13/953 |
| 2002/0039072 | A1* | 4/2002 | Gremmert | G01S 7/003 |
| | | | | 340/945 |
| 2009/0177343 | A1* | 7/2009 | Bunch | G01S 7/22 |
| | | | | 701/14 |
| 2009/0219197 | A1* | 9/2009 | Bunch | G01S 7/003 |
| | | | | 342/26 B |
| 2010/0245164 | A1* | 9/2010 | Kauffman | G01S 7/22 |
| | | | | 342/26 B |
| 2010/0245165 | A1* | 9/2010 | Kauffman | G01S 13/953 |
| | | | | 342/26 B |
| 2010/0302093 | A1* | 12/2010 | Bunch | H04B 7/18506 |
| | | | | 342/26 B |
| 2011/0074624 | A1* | 3/2011 | Bunch | G01S 7/003 |
| | | | | 342/26 D |
| 2015/0007080 | A1* | 1/2015 | Nama | G06F 3/0484 |
| | | | | 715/771 |
| 2015/0304813 | A1* | 10/2015 | Esposito | H04B 7/155 |
| | | | | 455/456.2 |

FOREIGN PATENT DOCUMENTS

| | | | | |
|---|---|---|---|---|
| EP | 3067710 | A1* | 9/2016 | ............. G01S 7/003 |
| EP | 3220170 | A1* | 9/2017 | ......... H04B 7/18506 |

* cited by examiner

ENHANCEMENT OF AIRBORNE WEATHER RADAR PERFORMANCE USING EXTERNAL WEATHER DATA

BACKGROUND

The inventive concepts disclosed herein relate generally to display systems, and more particularly, to weather radar display systems for aircrafts.

Weather radar systems may be used to alert operators of vehicles, such as an aircraft pilot, of weather hazards in areas near the vehicle, in areas along the vehicle's intended route, at the vehicle's intended final destination, and so on. However, weather radar systems are typically limited by a maximum range that the radar system is able to accurately scan. For example, a weather radar system onboard an aircraft may be able to detect turbulence up to 40 nautical miles (nm) away, vertical weather up to 100 nm away. Weather radar systems, including those onboard an aircraft, may receive supplemental data from external sources to supplement the information captured by the onboard weather radar system, but transferring the supplemental data typically requires high-bandwidth datalinks that are generally expensive and not always available.

SUMMARY

In one aspect, embodiments of the inventive concepts disclosed herein are directed to a weather radar control system. The weather radar control system includes at least one processor coupled with a communication system and a non-transitory processor-readable medium storing processor-executable code for causing the at least one processor to acquire first weather data for a first area extending from an aircraft from a weather radar system onboard the aircraft. The first weather data includes a first location of a weather event in the first area. The processor-executable code further causes the at least one processor to receive second weather data for a second area with respect to the aircraft via the communication system from an external location. The second weather data includes a second location of a weather event in the second area. The processor-executable code further causes the at least one processor to correlate the first weather data and the second weather data based on the first and second locations, and generate display data for display based on the correlated weather data. The display data is for a display area at least partially defined by the first and second areas. The processor-executable code further causes the at least one processor to provide the display data to a display system onboard the aircraft.

In a further aspect, embodiments of the inventive concepts disclosed herein are directed to a weather radar control system. The weather radar control system includes a communication system including a transmitter-receiver configured to receive weather data from an external location, and at least one processor coupled with the communication system and a non-transitory processor-readable medium storing processor-executable code for causing the at least one processor to acquire first weather data for a first area extending from an aircraft from a weather radar system onboard the aircraft. The first weather data includes a first location of a weather event in the first area. The processor-executable code further causes the at least one processor to receive second weather data for a second area with respect to the aircraft different from the first area from the external location based on a range of the first area extending from the aircraft. The second weather data includes a second location of a weather event in the second area. The processor-executable code further causes the at least one processor to correlate the first weather data and the second weather data based on the first and second locations, and generate display data for display based on the correlated weather data. The display data is for a display area at least partially defined by at least one of the first and second areas. The processor-executable code further causes the at least one processor to provide the display data to a display system onboard the aircraft.

In another aspect, embodiments of the inventive concepts disclosed herein are directed to a method of controlling a weather radar control system. The method includes acquiring first weather data for a first area extending from an aircraft from a weather radar system onboard the aircraft. The first weather data includes a first location of a weather event in the first area. The method further includes receiving second weather data for a second area with respect to the aircraft via a communication system from an external location. The second weather data includes a second location of a weather event in the second area. The method further includes correlating the first weather data and the second weather data based on the first and second locations and generating display data for display based on the correlated weather data. The display data is for a display area at least partially defined by the first and second areas. The method further includes providing the display data to a display system onboard the aircraft.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate exemplary embodiments of the inventive concepts disclosed herein in detail, it should be understood that the inventive concepts are not limited to the details or methodology set forth in the description or illustrated in the figures. It should also be understood that the terminology is for the purpose of description only and should not be regarded as limiting. For example, the inventive concepts disclosed herein are described with reference to an aircraft, however, it will be appreciated that the inventive concepts are not limited to being practice on or with reference to an aircraft. For example, components of the weather radar control system may be ground-based such that weather data may be acquired and/or processed on the ground and uplinked to display systems (e.g., built-in display, an electronic flight bag, tablet computer) on board an aircraft or otherwise communicated to an aircraft pilot for processing and/or analysis. Further, embodiments of the inventive concepts disclosed herein may be implemented with any radar system equipped vehicle or platform such as terrestrial vehicles, marine vehicles, submarine vehicles, unmanned aerial vehicles, and space vehicles.

Referring generally to the figures, the inventive concepts described herein may be used to provide low-bandwidth data packages from an external source to a weather radar system to provide weather data that would otherwise not be accessible to the weather radar system. The low-bandwidth data packages may generally include data acquired, processed, and/or generated by a ground-based and/or satellite-based weather radar system. The low-bandwidth data packages may include data indicative of lightning, turbulence, or other weather characterizations, as well as weather model information for weather threat areas. Data packages may be periodically transmitted to a weather radar control system onboard an aircraft and correlated with weather data acquired by the onboard weather radar system. For example, data packages may be transmitted from a ground-based weather radar system to an onboard weather radar system via an ARINC 429 data bus, Ethernet bus, or other data bus. Upon receiving data packages from an external weather system, the onboard weather radar control system may be configured to display information relating to weather threats beyond the range of the radar of the aircraft.

Figure 1A:
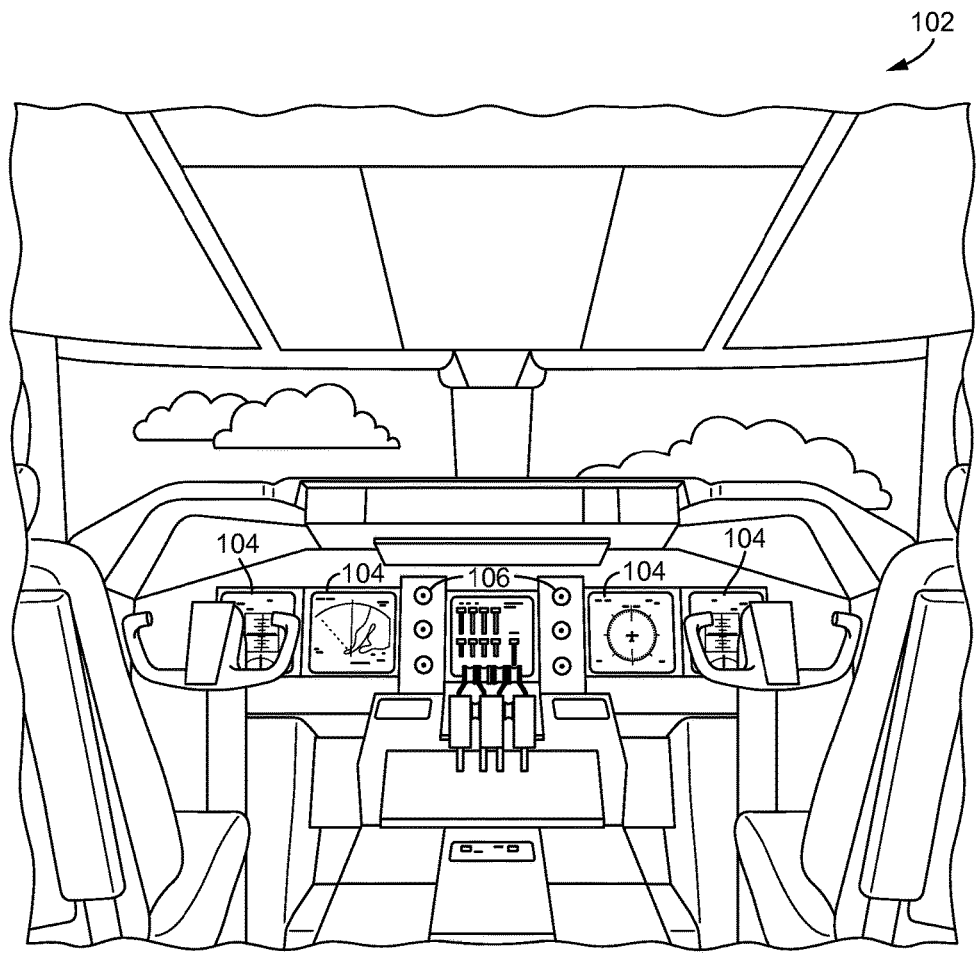
FIG. 1A is a schematic illustration of an aircraft control center or cockpit, according to an exemplary embodiment.

Referring to FIG. 1A, a schematic illustration of an aircraft control center or cockpit 102 is shown according to an exemplary embodiment of the inventive concepts disclosed herein. The aircraft control center 102 may include one or more flight displays 104 and one or more user interface ("UI") elements 106. The flight displays 104 may be implemented using any of a variety of display technologies, including CRT, LCD, organic LED, dot matrix display, and others. The flight displays 104 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 104 may be used to provide information to the flight crew, thereby increasing visual range and enhancing decision-making abilities. One or more of the flight displays 104 may be configured to function as, for example, a primary flight display (PFD) used to display altitude, airspeed, vertical speed, and navigation and traffic collision avoidance system (TCAS) advisories. One or more of the flight displays 104 may also be configured to function as, for example, a multi-function display used to display navigation maps, weather radar, electronic charts, TCAS traffic, aircraft maintenance data and electronic checklists, manuals, and procedures. One or more of the flight displays 104 may also be configured to function as, for example, an engine indicating and crew-alerting system (EICAS) display used to display critical engine and system status data. Other types and functions of the flight displays 104 are contemplated as well. According to various exemplary embodiments of the inventive concepts disclosed herein, at least one of the flight displays 104 may be configured to provide a rendered display from the systems and methods of the present disclosure.

In some embodiments, the flight displays 104 may provide an output based on data received from a system external to an aircraft, such as a ground-based weather radar system, satellite-based system, or from a system of another aircraft. In some embodiments, the flight displays 104 may provide an output from an onboard aircraft-based weather radar system, LIDAR system, infrared system or other system on an aircraft. For example, the flight displays 104 may include a weather display, a weather radar map, and a terrain display. In some embodiments, the flight displays 104 may provide an output based on a combination of data received from multiple external systems or from at least one external system and an onboard aircraft-based system. The flight displays 104 may include an electronic display or a synthetic vision system (SVS). For example, the flight displays 104 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 106 may include, for example, dials, switches, buttons, touch screens, keyboards, a mouse, joysticks, cursor control devices (CCDs) or other multi-function key pads certified for use with avionics systems. The UI elements 106 may be configured to, for example, allow an aircraft crew member to interact with various avionics applications and perform functions such as data entry, manipulation of navigation maps, and moving among and selecting checklist items. For example, the UI elements 106 may be used to adjust features of the flight displays 104, such as contrast, brightness, width, and length. The UI elements 106 may also (or alternatively) be used by an aircraft crew member to interface with or manipulate the displays of the flight displays 104. For example, the UI elements 106 may be used by aircraft crew member to adjust the brightness, contrast, and information displayed on the flight displays 104. The UI elements 106 may additionally be used to acknowledge or dismiss an indicator provided by the flight displays 104. The UI elements 106 may be used to correct errors on the flight displays 104. Other UI elements 106, such as indicator lights, displays, display elements, and audio alerting devices, may be configured to warn of potentially threatening conditions such as severe weather, terrain, and obstacles, such as potential collisions with other aircraft.

Figure 1B:
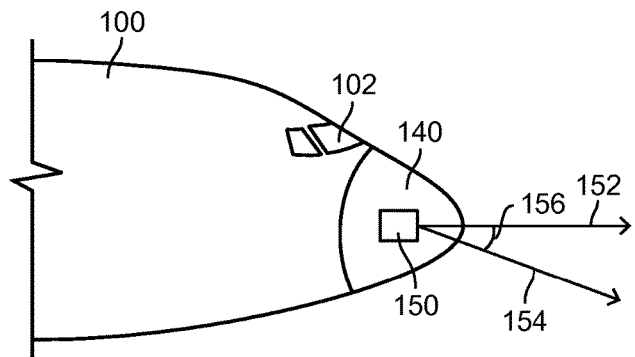
FIG. 1B is a schematic illustration of the front of an aircraft including a radar system and the aircraft control center or cockpit, according to an exemplary embodiment.

Referring to FIG. 1B, a schematic illustration of the front of an aircraft 100 is shown according to an exemplary embodiment of the inventive concepts disclosed herein. The aircraft 100 includes a nose 140, a radar system 150, and the aircraft control center or cockpit 102. The radar system 150, such as a weather radar system or other radar system, is generally located inside the nose 140 of the aircraft 100 or inside the cockpit 102 of the aircraft 100. According to other exemplary embodiments of the inventive concepts disclosed herein, the radar system 150 may be located anywhere on the aircraft 100, such as on the top of the aircraft 100, on the belly of the aircraft 100, on the tail of the aircraft 100, or on either or both sides of the aircraft 100. Various components of the radar system 150 may be distributed at multiple locations throughout the aircraft 100. The radar system 150 may include or be coupled to an antenna system of the aircraft 100. The radar system 150 or other equipment onboard the aircraft 100 may be configured to receive weather data from other sources. For example, the radar system 150 or other equipment aboard the aircraft 100 may receive weather data from ground-based weather radar systems, satellite-based systems, and from aircraft-based system of other aircraft. The radar system 150 may be any radar system configured to detect or receive data for the systems and methods of the present disclosure. According to exemplary embodiments of the inventive concepts disclosed herein, the radar system 150 may be an RTA-4218 MULTISCAN radar system, a WXR-2100 MULTISCAN radar system, or similar system manufactured by Rockwell Collins, Inc., and configured in accordance with the inventive concepts described herein.

The radar system 150 may generally operate by sweeping a radar beam horizontally back and forth across the sky. For example, the radar system 150 may conduct a first horizontal sweep 152 directly in front of the aircraft 100 and a second horizontal sweep 154 downward at a tilt angle 156 (e.g., 20 degrees downward). Returns from different tilt angles may be electronically merged to form a composite image for display on an electronic display, such as the flight displays 104 in the aircraft control center 102. Returns may also be processed to, for example, distinguish among terrain, weather, and other objects, to determine the height of the terrain, and to determine the height of the weather.

The radar system 150 may also sweep a radar beam vertically back and forth across the sky. In some embodiments, the radar system 150 may sweep a radar beam vertically back and forth at varying vertical tilt angles. Results from the different vertical tilt angles may be analyzed to determine the characteristics of weather. For example, the altitude, range, and vertical height of weather conditions may be determined using the vertical scan results. The vertical scan results may be used to form an image for display on an electronic display. For example, a vertical profile view of the weather may be generated and provided to flight crew on the flight display 104 of the aircraft control center 102. The profile may be used by a pilot to determine height, range, hazards and threats, and other relevant information that may be utilized by an aircraft crew member to evaluate a current course or to change the course of the aircraft to avoid the detected weather condition.

Figure 2:
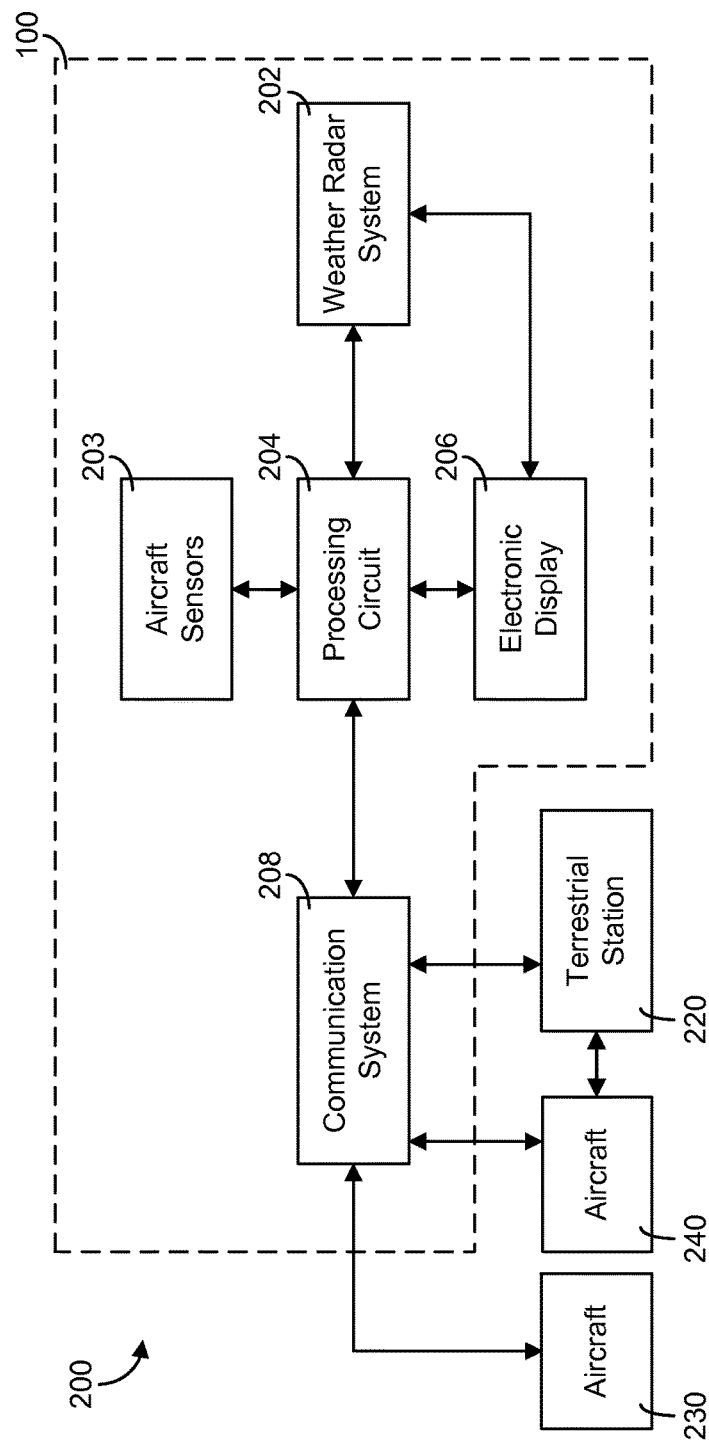
FIG. 2 is a block diagram of a weather detection system, according to an exemplary embodiment.

Referring to FIG. 2, a block diagram of a weather detection system 200 is shown according to an exemplary embodiment of the inventive concepts disclosed herein. The weather detection system 200 includes a weather radar system 202 (e.g., a system similar to the radar system 150), aircraft sensors 203, electronics (such as a processing circuit 204), an electronic display system 206 (e.g., including a display similar to the flight displays 104), and a communication system 208. The communication system 208 may be configured to communicate with external systems, such as other aircraft 230, 240 and a terrestrial station 220. The weather radar system 202 may be configured to cast one or more radar signals from an aircraft mounted antenna, to receive returns, and to interpret the returns (e.g., for display to a user, for transmission to an external weather system). In some embodiments, the weather radar system 202 is configured to receive weather data via the communication system 208 and the processing circuit 204 from external systems, such as ground-based weather radar systems (e.g., the terrestrial station 220), satellite systems, and the systems of other aircraft (e.g., other aircraft 230, 240).

In some embodiments, the weather radar system 202 may perform multiple radar sweeps. The radar sweeps may include horizontal sweeps, vertical sweeps, or a combination of horizontal and vertical sweeps. The radar sweeps may be performed such that the sweeps are substantially orthogonal to one another. According to some embodiments, the weather radar system 202 can be a monopulse radar system, a sequential lobing system, or a radar system with an aperture capable of switching modes. The aircraft sensors 203 may include, for example, one or more airspeed sensors, location tracking sensors (e.g., GPS), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, fuel sensors, or any other aircraft sensors or sensing systems that may be used to monitor the performance of an aircraft or weather local to or remote from the aircraft. Data from the aircraft sensors 203 may be output to the processing circuit 204 for further processing and display, for input to the weather radar system 202, or for transmission to a station (e.g., a ground-based weather radar system or terrestrial station such as the terrestrial station 220, air traffic control services system, or other terrestrial station), satellite, or to the other aircraft 230, 240 via the communication system 208. Data collected from external systems (e.g., the terrestrial station 220) may also be processed by the processing circuit 204 to configure the collected data for display and to provide the data to the weather radar system 202 to be processed and used to control aspects of the weather radar system 202.

The weather radar system 202 may be a system for detecting weather patterns. Detected weather patterns may be communicated to the electronic display system 206 for display to the flight crew. Data received from an external station (e.g., the terrestrial station 220, a satellite system, the other aircraft 230, 240) may be displayed on the display system 206. Detected weather patterns may instead or may also be provided to electronics and/or the processing circuit 204 for further processing and analysis, for use in automated functions, or for transmission to an external system (e.g., the terrestrial station 220, a satellite system, the other aircraft 230, 240) via the communication system 208.

In some embodiments, the aircraft 100 and/or the other aircraft 230, 240 may scan in specific areas to improve detection accuracy of weather based on data received via the communication system 208 from an external source (e.g., the terrestrial station 220). For example, the aircraft weather radar system 202 may adjust its own tilt angle to improve the likelihood of detecting weather based on receiving the Freezing Level and Tropopause Level from the terrestrial station 220. In some embodiments, systems aboard the aircraft 100 and/or the other aircraft 230, 240 may scan in specific areas based on further processing and/or analysis of the received data. In some embodiments, the external source may request or direct the aircraft 100 and/or the other aircraft 230, 240 via the communication system 208 to scan in specific areas. Alternatively, the weather radar system 202 may request or direct that the terrestrial station 220 and the other aircraft 230, 240 direct a scan towards weather that is of interest to the aircraft 100 (e.g., weather in the flight path of the aircraft 100) to improve weather detection accuracy. The scans performed by the weather radar system 202 and the requests may be transmitted to the terrestrial station 220 or the other aircraft 230, 240 via the communication system 208.

Figure 3:
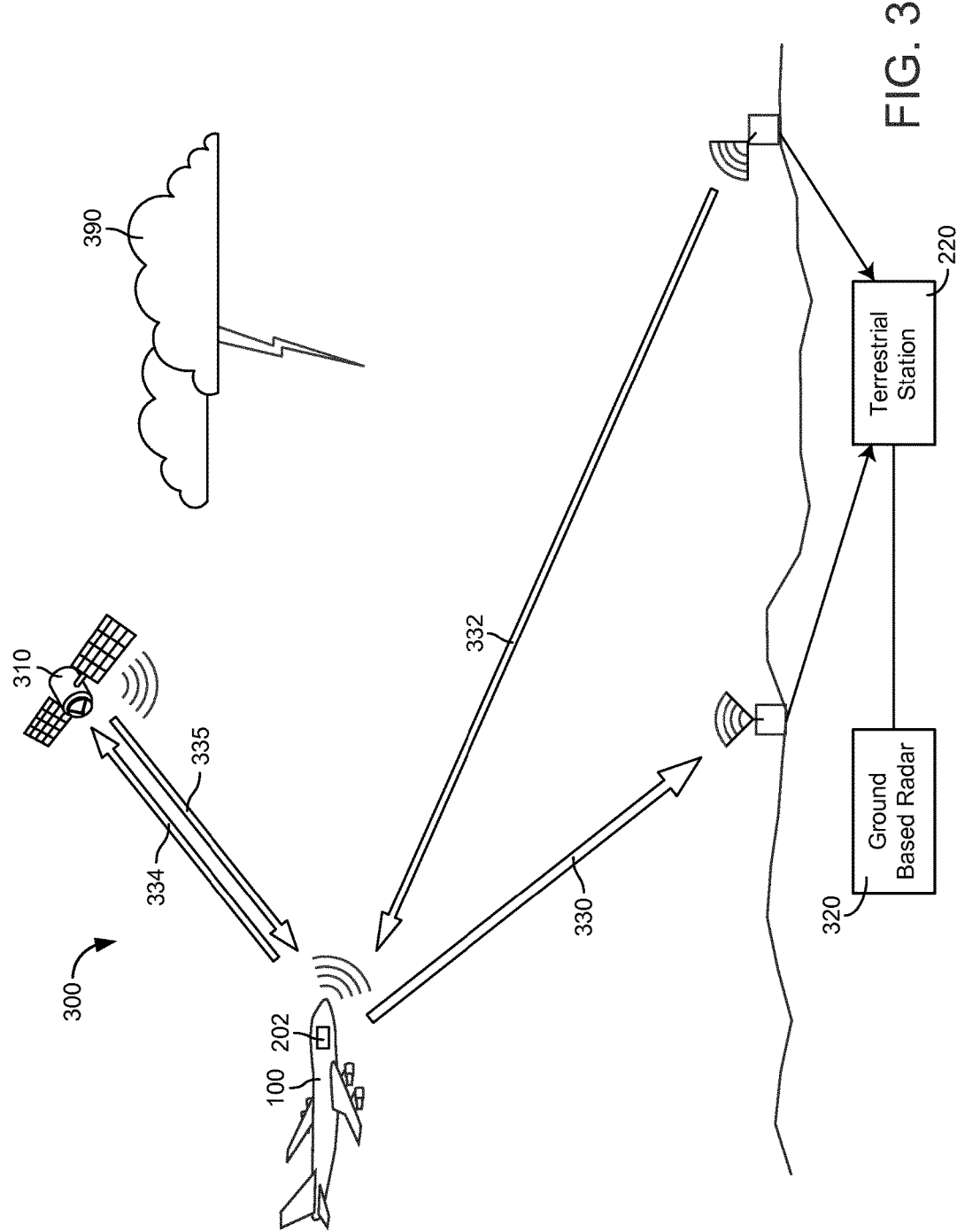
FIG. 3 is a diagram of an aircraft communications system, according to an exemplary embodiment.

Referring to FIG. 3, a diagram of an aircraft communications system 300 is shown according to an exemplary embodiment of the inventive concepts disclosed herein. The aircraft communications system 300 may facilitate communications among the aircraft 100 having the weather radar system 202 onboard, a ground-based data center (e.g., the terrestrial station 220), a satellite 310, and other aircraft (e.g., the other aircraft 230, 240). The terrestrial station 220 may receive weather data and other aircraft data (e.g., a route) via a first channel 330 from the aircraft 100. The terrestrial station 220 may utilize data and communications from more than one aircraft and satellite even though just one aircraft 100 and satellite 310 are shown in FIG. 3. Additional data may be received from a ground-based radar 320 from a wireless or wired channel. The terrestrial station 220 may provide data to the aircraft 100 via a second channel 332, such as weather data, scheduling data, and other control data. While two channels are shown in FIG. 3 for communication with the aircraft 100, it will be appreciated that any number of channels may be used for communications between the terrestrial station 220 and the aircraft 100. The satellite 310 may provide data to the aircraft 100 via a third channel 334, and to other aircraft or ground stations, and similarly may receive data from the aircraft 100 via a fourth channel 335. In some embodiments, the satellite 310 may provide data to and receive data from other aircraft or ground stations.

Various types of channels may be utilized including virtual channels, radio channels, satellite channels. The channels may be bi-directional or uni-directional. Channels may be satellite link channels, VHF channels, INMARSAT channels. Any type of wireless communications may be utilized. Various types of communication protocols, including network and ad hoc network protocols may be used to perform communication operations and to establish the channels depicted in FIG. 3.

In some embodiments, the channels may facilitate a low-bandwidth link between the aircraft 100 and the terrestrial station 220. A low-bandwidth data package may be generated, created, or otherwise developed or assembled at the terrestrial station 220 and transmitted to the aircraft 100. In some embodiments, the terrestrial station 220 transmits the data package to the aircraft 100 via the satellite 310 and/or the other aircraft 230. The data package may include weather radar data and other data based on or impacted by the weather radar data (e.g., aircraft route information). The data may be transmitted via, for example, a spare ARINC 429 data bus, an Ethernet bus, or other data bus.

The weather data exchanged among the terrestrial station 220, the satellite 310, and the aircraft 100 may be in any number of forms. For example, the weather data may include radar data containing any of the data types described herein, including location information, motion vector data, time of sensing information, or measured parameter values for a weather condition 390. The location information may be in, for example, a format based on azimuth, elevation, and range from the radar system or another fixed reference point, in a rectangular grid format, a polygon grid format, a georegistered format, or other format. In some embodiments, the information may be based on coordinates of vertices with reference to a grid (e.g., a latitude, longitude, and elevation grid). In some embodiments, the radar data may be based on a representation of range and azimuth. The radar data may also include radar characteristics associated with the radar used to provide the radar data. The characteristics may include an indication of band-type, radar quality, or tilt angle. In some embodiments, the terrestrial station 220 may adjust the radar data based on the band-type characteristic (e.g., to provide consistency when comparing data from radar systems using different band-types, such as S or C band radar).

In some embodiments, the weather data may be provided from a plurality of sources. The weather data may also be indicative of one or more types of weather conditions. For example, the weather data may be indicative of convective weather systems (e.g., thunderstorms), turbulence, winds aloft, icing, hail, or volcanic ash. In some embodiments, data regarding convective weather systems may be provided from a ground-based weather system such as NEXRAD or a satellite-based weather system such as the U.S. Geostationary Operational Environmental Satellite system (GOES) or the Polar Operational Environmental Satellite (POES) system. Such data may include IDs for an adaptable number of weather cells, which may be segmented (e.g., delivered in polygon format) weather cells identified in a series of radar volume scans. Individual weather cells may be, for example, 3-D regions of significant reflectivity or other values above one or more specified threshold values. Individual weather cells may be composed of reflectivity radial run segments, and in turn, 2-D weather components composed of segment groups and occurring at different radar elevation angles. Weather components with calculated centroids may be vertically correlated into a cell with an established centroid. Such weather cell data may also include individual data points and trends for each weather cell. For example, current weather cell location may be provided with azimuth, range, direction, and speed information, such as a motion vector using polar and/or Cartesian coordinates along with an estimate of any tracking errors. Other information may be included such as, for example, storm base height, storm top height, maximum reflectivity, height of maximum reflectivity, probability of hail, probability of severe hail, cell-based vertically integrated liquid (VIL) content, enhanced echo tops (EET) and centroid height, among other information types described in further detail herein. Weather tracking data may be generated by monitoring movement of weather cells and matching cells in current and prior volume scans. Forecast data may be generated by predicting future centroid locations based on prior volume scans, and growth, decay, and/or shape change estimates. Average data for multiple weather cells may be provided as well (e.g., average motion vector data). The weather data may be provided as, for example, a table of alphanumeric values, and/or as a stand-alone display or graphical overlay.

It will be appreciated that any combination of data from any number of external sources may be combined, merged, and/or analyzed to provide weather data on a display screen or to determine an operation parameter or point of interest used to control the weather radar system 202. It will also be appreciated that other data sources may be used than those specifically mentioned in this disclosure, and that any data, index, or parameter that classifies, describes, or otherwise characterizes weather conditions may be adapted and/or interpreted by the control module to control the weather radar system 202, including controlling scanning characteristics and weather detection characteristics to increase and/or maximize the probability of detecting convective activity, other weather condition, or a non-weather event. In some embodiments, the weather radar system 202 is configured to adjust at least one of a scanning characteristic, a pulse characteristic, and a frequency characteristic based on information received from an external source, such as the terrestrial station 220.

Figure 4A:
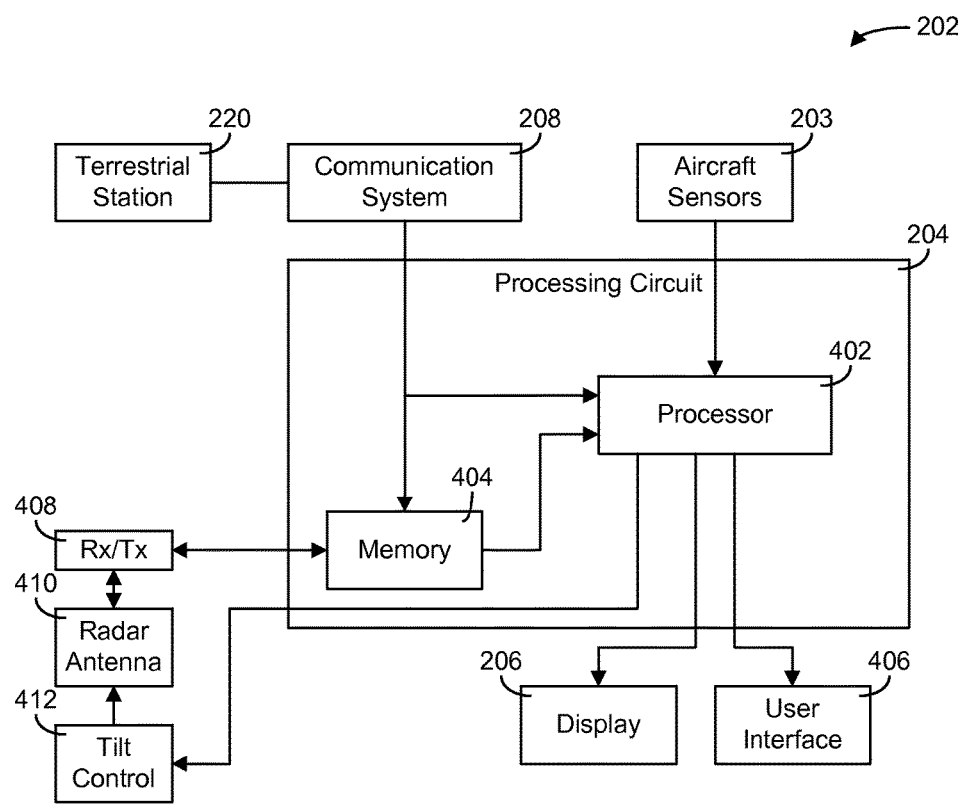
FIG. 4A is a block diagram of a weather radar control system, according to an exemplary embodiment.

Referring to FIG. 4A, a block diagram of the weather radar system 202 is shown according to an exemplary embodiment of the inventive concepts disclosed herein. The weather radar system 202 may include a weather radar receiver/transmitter 408 (e.g., similar to or the same as the communications module or communications system 208), a weather radar adjustable antenna 410 and a tilt control 412 for automatically controlling the tilt angle (mechanical or electronic) of the antenna 410. The weather radar system 202 may further include a processing circuit 204 including a processor 402 and a memory 404, one or more displays 206 as described with reference to FIG. 2, and one or more user interface elements 106 as described with reference to FIG. 1A. The weather radar system 202 may be in communication with one or more remote data sources, such as the terrestrial station 220, another aircraft, or another ground station, via the communication system 208 (e.g., radio or other wireless communication device).

The memory 404 may include any type of machine-readable storage device capable of storing radar returns or associated weather data or program instructions for analysis/processing by the processor 402. The memory 404 may be, for example, a non-transitory machine-readable media for carrying or having machine-executable instructions or data structures stored thereon. Such machine-readable media may be any available media that may be accessed by a special purpose computer or other machine with a processor. By way of example, such machine-readable media may include random access memory (RAM), read only memory (ROM), erasable programmable read only memory (EPROM), electrically erasable programmable memory (EEPROM), CD-ROM or other optical disk storage, magnetic disk storage or other magnetic storage devices, or any other medium which may be used to carry or store desired program code in the form of machine-executable instructions or data structures and which may be accessed by a special purpose computer or other machine with a processor. Combinations of the above are also included within the scope of machine-readable storage media. Machine-executable instructions include, for example, instructions and data which cause a special purpose computer or special purpose processing machine to perform a certain function or group of functions. Machine or computer-readable storage media, as referenced herein, do not include transitory media (i.e., signals in space). The weather radar system 202 may have one or more memories 404 that use the same or a different memory technology.

In some embodiments, the memory 404 may be capable of storing in a readily addressable and rapidly retrievable manner multiple sets of weather data resulting from multiple antenna sweeps at different angles, although a single scan of data may also be used in some embodiments. The memory 404 may also include a three-dimensional storage buffer for storing weather radar parameters according to X, Y, and Z coordinates according to one embodiment. The memory 404 may further store weather data received from external sources, such as the terrestrial station 220. The storage of radar data and the form of the weather data stored therein is not disclosed in a limiting fashion.

In some embodiments, weather data may be stored in the memory 406 as a mathematical equation representation of the information. The mathematical equation representation may be a piecewise linear function, piecewise nonlinear function, coefficients of a cubic spline, coefficients of a polynomial function, and so on, that represents vertical representations of a weather condition based on the horizontal scan data and/or horizontal representation of the weather condition based on the vertical scan data. The function may be an equation based on weather parameters that may be sensor driven, model driven, and/or a merger of sensor and model. Although horizontal scan data is described, alternative embodiments may include Cartesian coordinates, rho/theta input, latitude and longitude coordinates, and/or altitude. Weather conditions may be estimated for any desired point in space with the vertical dimension being the subject of the Radar Equation (e.g., how much power is returned to the radar receiver given what it is pointed at).

The processor 402 may be implemented in hardware, firmware, software, or any combination of these methods. The weather radar system 202 may have one or more processors 402 that use the same or a different processing technology. Additionally, the processor 402 may be a separate component of the weather radar system 202 or may be embedded within another component of the weather radar system 202. The processor 402 may execute instructions that may be written using one or more programming languages, scripting languages, and/or assembly languages. The instructions may be carried out by, for example, a special purpose computer, logic circuits, or hardware circuits. The term "execute" is the process of running an application or the carrying out of the operation called for by an instruction. The processor 402 may process data and/or execute applications stored in the memory 404, such as weather data and/or other instructions.

The processor 402 may be included as part of a multi-scan, multi-tilt angle weather radar system and may perform the customary functions performed by a conventional weather radar return processing unit. The processor 402 may also perform several additional operations based upon the additional data and/or instructions provided in the memory 404. In general, the processor 402 may merge or cross qualify portions, or ranges, of the radar returns of several different antenna sweeps at several different tilt angles, and/or weather data received from one or more external sources so that a single, relatively clutter-free image may be presented to the pilot based upon the several separate scans. The radar returns may be processed by the processor 402 to generate a 2-D, 3-D, or 4-D weather profile of the weather near the aircraft 100. In some embodiments, the processor 402 may merge or cross qualify portions, or ranges, of the radar returns or weather data of several different sources, including weather data from one or more remote sources (e.g., the terrestrial station 220, the satellite 310, the other aircraft 230, 240), so that a composite or fused image may be presented to the pilot based upon the several weather data sources.

The processor 402 may process weather radar returns to identify or sense the presence of weather conditions in front of (e.g., in the flight path) or in view of the aircraft 100. In some embodiments, the processor 402 may utilize the altitude and range of the weather condition to generate a vertical profile associated with the weather. The processor 402 may scan across an array of azimuths to generate a 3-D weather profile of the weather near the aircraft 100, which may be stored for later presentation and/or displayed on the display 410. In some embodiments, additional visual indicators other than the representation of weather are provided on the display 410. In some embodiments, a range and bearing matrix having range markers indicating distance from a current location of the aircraft 100 and bearing markers indicating azimuths from a current flight path or bearing of the aircraft 100 may be provided and may assist the pilot in cognitive recognition of weather features from the pilot's perspective.

Figure 4B:
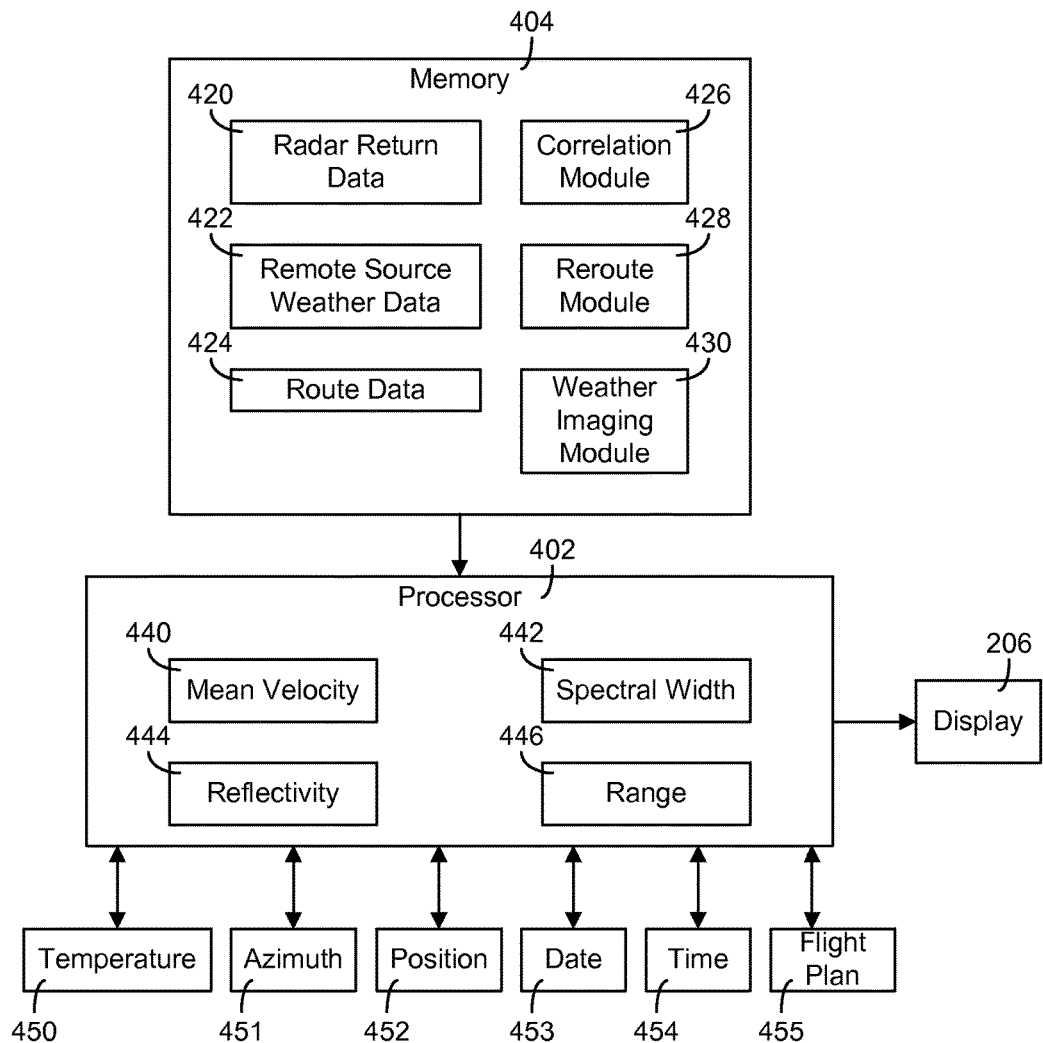
FIG. 4B is a data flow diagram of a weather radar control system, according to an exemplary embodiment.

Referring now to FIG. 4B, a data flow diagram of the weather radar system 202 is shown according to an exemplary embodiment of the inventive concepts disclosed herein. Weather data from returns received by the antenna 410 (e.g., the radar return data 420) and weather data received from a remote source such as the terrestrial station 220 (e.g., the remote source weather data 422) may be stored in the memory 406. The weather data may be based on, for example, received horizontal and/or vertical radar scans and/or data from other sources (e.g., NEXRAD weather data). The weather data may also be from another weather radar source or data from an onboard weather radar system operating at a different frequency, such as a millimeter frequency, a Ka band frequency, or a W band frequency. In some embodiments, the weather data may be from a non-radar airborne source (a LIDAR source, an infrared source). The weather data may include a time of sensing data, such as a time stamp, and motion vector data (e.g., individual weather cell and average motion vector data) for temporal and spatial correlation (e.g., NEXRAD data).

The radar return data 420 from the antenna 410 may be captured by the weather radar system 202 during normal operation of the weather radar system. The antenna 410 may generally be limited in range due to general performance limits. For example, using the radar return data 420, the processor 402 may only be able to detect turbulence up to 40 nm away, vertical weather threats up to 100 nm away, lightning threats up to 160 nm away. Remote source weather data 422 may be received from the terrestrial station 220 or another source and may generally include weather data for areas beyond the range of the antenna 410. For example, the terrestrial station 220 may receive radar returns covering a wider area the antenna 410 is able to cover from one or more ground-based radars 320. The terrestrial station 220 may generate weather data to transmit to the weather radar system 202 based on radar returns from the ground-based radars 320 and weather data received from satellites.

The remote source weather data 422 may be sent by the terrestrial station 220 in a data format similar to the format of the radar return data 420. The remote source weather data 422 may then be correlated with the radar return data 420 by the processor 402. Regions of interest identified by the remote source weather data 422 that are not in range of radar return data 420 may be determined by correlating and comparing the two sets of data.

The memory 404 may further store the route data 424. The route data 424 may generally indicate a flight plan for the aircraft 100, a destination of the aircraft 100, and any other information relating to the operation of the aircraft 100. The route data 424 may be entered by a pilot of the aircraft 100 and/or retrieved from another aircraft system. The route data 424 may be configured for display on the display 206 and updated (e.g., based on receiving new route information or weather data).

The memory 404 is further shown to include a correlation module 426. The correlation module 426 may be configured to correlate weather data from multiple sources, such as the radar return data 420 and the remote source weather data 422. Weather data may be transmitted from the terrestrial station 220 to the weather radar system 202 in a similar format to the weather data generated by the antenna 410. The correlation module 426 correlates the data from the two (or more) sources using relative position information contained within each data structure. Once the data is correlated, the correlation module 426 may determine the differences between the data sources. For example, the range of a ground radar from which the terrestrial station 220 receives weather data may be much larger than the range of the antenna 410. The correlation module 426 may identify areas not covered by the antenna 410 that are covered by the ground-based radar 320. The correlation module 426 may identify one or more points of interest in the range of the ground-based radar 320 but beyond the range of the antenna 410. The points of interest may correspond with one or more weather threat areas (e.g., one or more weather cells outside the range of the antenna 410). In another example, the correlation module 426 may identify differences in radar returns for the same area from two or more sources, and may reconcile the differences. In some embodiments, the correlation module 426 is configured to determine and/or select a distance or planning horizon to correlate the weather data received from an external source with weather data acquired by a weather radar system onboard the aircraft 100. In some embodiments, the correlation module 426 determines the distance horizon based on datalink weather usage guidelines known in the art. For example, in some embodiments, the correlation module 426 is configured to determine at least one of a particular product to use, a type of weather indicator to display, and a type of weather data needed for a particular distance away from the aircraft 100 based on at least one of a mission phase, a planning horizon/distance, and an available datalink product. In some embodiments, the correlation module 426 is configured to automatically request weather data from an external source based on determining that the particular type of weather data is needed to provide a display for the particular weather data for a particular display horizon or distance from the aircraft. In some embodiments, the correlation module 426 is configured to automatically determine the display horizon based on the type of weather product to be displayed. In some embodiments, the display horizon may be based on a user input. In some embodiments, the display horizon may be vary for different types of weather products. In some embodiments, a first display horizon may be used for a first location and a second display horizon may be used for a second location. For example, in some embodiments, the correlation module 426 may receive and/or require external weather data for a particular weather product for an area 100 nm from the aircraft 100 when the aircraft is at a first location but may require external weather data the particular weather product for an area 50 nm from the aircraft 100 when the aircraft is at a second location (e.g., due to attenuation).

The memory 404 is further shown to include a reroute module 428. Depending on the output of correlation module 426, one or more points of interest may be identified over which travel may be difficult or impossible. These points of interest are beyond the range of detection of antenna 410, therefore a flight path or route of the aircraft 100 may not have accounted for the points of interest (i.e., the flight path does not account for hazardous weather along the path). In such a case, reroute module 428 may be configured to calculate a new route for the aircraft 100 based on the detection of additional weather threats by correlation module 426.

In some embodiments, in addition to or alternatively to calculate a new route, the aircraft 100 may receive a new route or new directions from the terrestrial station 220 or another remote source. For example, communication system 208 may be configured to receive route data as part of the weather data transmitted by the terrestrial station 220.

Reroute module 428 may be configured to change the route of the aircraft 100 based on the received new route and instructions In some embodiments, reroute module 428 may request pilot input for the new route (e.g., accepting manual changes to the route, receiving a confirmation of the new route).

In some embodiments, route data 424 and the current position of the aircraft 100 may be transmitted via communication system 208 to the terrestrial station 220. Route data 424 may be transmitted periodically to the terrestrial station 220, or may be transmitted based on a change of route or condition at the aircraft 100. A controller at the terrestrial station 220 or ground-based radar 320 may then use route data 424 along with remote source weather data 422 to determine a new route for an aircraft in order to avoid hazardous conditions. For example, the terrestrial station 220 or the ground-based radar 320 may receive the position of the aircraft 100 and the flight path programmed into a flight management system of the aircraft 100. The controller may monitor the regions including the planned route of the aircraft 100 for geospatial intersection with predefined threats. The predefined threats may include, for example, convective activity (a dBZ value greater than a configurable dBZ parameter may indicate a threat), lightning strikes, icing levels, wind shear, turbulence (a EDR value greater than a configurable EDR parameter may indicate a threat), TFRs, and volcanic ash. When the planned route of flight of the aircraft 100 intersects with a threat (or comes within an area within a configurable threshold of the route), an alert and/or new route may be generated and sent to aircraft 100. Updates to the route and/or the threat that caused the alarm may be transmitted to aircraft 100 periodically or as necessary. A new flight plan may be uploaded into the flight management system of the aircraft 100 automatically or upon validation or approval by a pilot of the aircraft 100. The new route may be displayed alongside the new weather threat information generated by correlation module 426 and weather imaging module 430. In some embodiments, the determination of the new route and associated steps may be done at reroute module 428 instead of at a controller located remotely from the aircraft 100. In some embodiments, the controller may transmit an indication to the aircraft 100 that no threat or hazard was detected along the route of the aircraft 100.

Memory 404 is further shown to include a weather imaging module 430. Weather imaging module 430 may generally be configured to utilize weather data from radar return data 420 and remote source weather data 422 to provide individual, composite, fused, or overlay image data indicative of a weather condition for display on display 206. The derived image data may be spatially correlated by weather imaging module 430 using, for example, time of sensing information and motion vector values. In some embodiments, growth and decay information may be received, which may be used by weather imaging module 430 to increase or decrease the size, shape, and intensity of an image or other visual indication of a weather condition displayed in accordance with time.

In some embodiments, weather imaging module 430 may determine a confidence factor reflecting the degree to which weather data received from multiple sources agree in their characterization of the weather condition. In some embodiments, weather imaging module 430 may combine estimates of storm top height received from multiple sources of weather data to provide image data indicative of the vertical extent of a weather condition.

Processor 402 may use weather data, route data, and other data from memory 404 to configure various parameters for the aircraft 100. Processor 402 may provide a velocity parameter 430, such as a mean velocity parameter and a spectral width parameter 432 (e.g., derived from weather radar returns or from weather data from a remote source for individual or grouped weather cells). Alternatively, other types of velocity parameters can be utilized. In addition, processor 402 may provide a reflectivity parameter 444 and a range parameter 446. Range parameter 446 along with scan angle position may be used to plot the location of a weather condition on display 206. Processor 402 may also receive a temperature parameter 450, an azimuth 451, a location 452, a date 453, a time 454, and a flight plan 455 from another source, such as an external sensor or system, among other data (e.g., air pressure, dew point, winds at altitude). In some embodiments, parameters 450, 451, 452, 453, 454 and 455 may be computed by processor 402 using data stored in memory 404.

Figure 5:
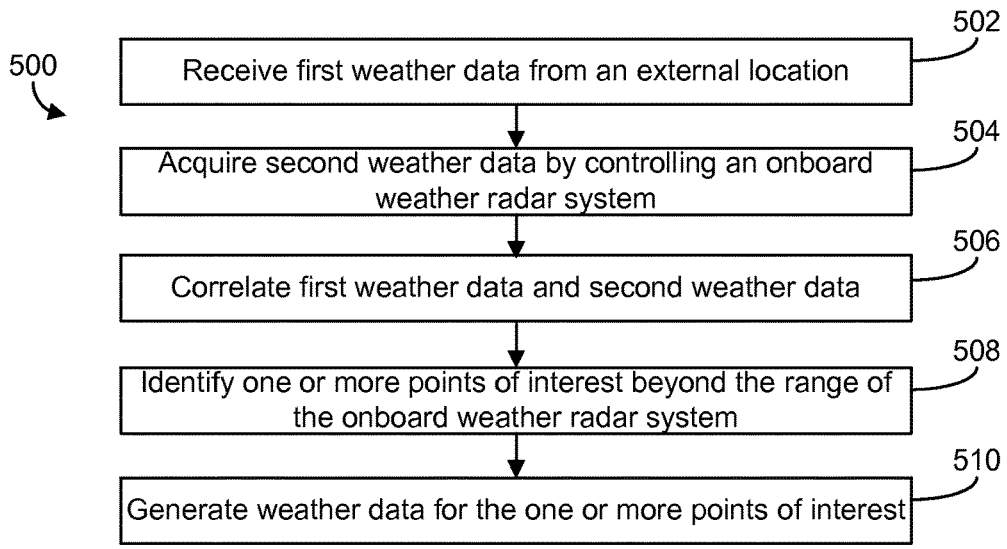
FIG. 5 is a flow diagram of a process for controlling a weather radar control system of an aircraft, according to an exemplary embodiment.

Referring now to FIG. 5, a flow diagram of a process 500 for controlling a weather radar control system of the aircraft 100 is shown according to an exemplary embodiment of the inventive concepts disclosed herein. The process 500 may be implemented using any of the systems and/or apparatuses disclosed herein, for example such as the weather radar system 202. The process 500 includes receiving first weather data from an external location (502). The external location may be, for example, a ground-based weather radar system such as the terrestrial station 220. In some embodiments, the ground-based weather radar system transmits radar returns to a ground-based system (e.g., the terrestrial station 220) configured to communicate with the aircraft 100. In some embodiments, the weather data is packaged in a data structure similar to the data structure of radar return data for the aircraft 100 before being transmitted to the aircraft 100. The weather data may include ground radar return data, satellite data, numerical weather model information, and information about any potential threat or hazard (e.g., turbulence, lightning) detected by the ground-based weather radar system. The weather data is packaged such that it can be correlated with radar return data acquired by a weather radar system onboard the aircraft 100. For example, the weather data may be associated with an identifier that includes location information (e.g., latitude, longitude, altitude) that identifies the location of a weather condition. The weather data may be packaged and/or transmitted based on the identifier. For example, in some embodiments, the weather data is transmitted to the aircraft 100 based on the weather data including an identifier that associates the weather data with a particular location (e.g., a certain distance away from the aircraft 100, a certain location). In some embodiments, only weather data having an identifier associated with a particular location or a certain distance away from the aircraft 100 is transmitted to the aircraft 100. For example, in some embodiments, weather data having an identifier associated with a location up to 60 nautical miles away from the aircraft 100 is not transmitted to the aircraft 100 while weather having an identifier associated with a location over 60 nautical miles away from the aircraft 100 is transmitted to the aircraft 100. In some embodiments, the weather data transmitted to the aircraft 100 may have an identifier associated with a region of the aircraft 100. For example, the weather data may be transmitted to the aircraft 100 based on an aeronautical region that the aircraft 100 is in or will be in (e.g., a future region of the aircraft 100), a planned flight route of the aircraft 100, a current flight route of the aircraft 100, or a potential flight route of the aircraft 100. In some embodiments, aircraft-acquired weather data is transmitted from the aircraft 100 to the ground station, the aircraft-acquired weather data is correlated with the weather data acquired by the ground station, and then the combined weather data is transmitted to the aircraft 100. In some embodiments, the first weather data is transmitted to the aircraft 100 based on the aircraft 100 deviating from a flight plan. For example, the aircraft 100 may transmit its flight plan and location to the terrestrial station 220, which transmits second weather data to the aircraft 100 when the aircraft 100 deviates from the flight plan (e.g., the flight plan is changed and an update is sent to the terrestrial station 220, or the aircraft 100 travels a particular distance off course).

In some embodiments, the weather data is transmitted to the aircraft 100 using low bandwidth transmission schemes. For example, in some embodiments the weather data is transmitted over a low bandwidth channel. In another example, the weather data may be transmitted using a bus. For example, the weather data may be transmitted using a spare bus that is currently not being used by the aircraft 100 or is intermittently used by the aircraft 100 such that the weather data may be transferred when the bus is not in use. In another example, the weather data may be transmitted to the aircraft 100 over an ARINC 429 data bus or Ethernet bus. In some embodiments, the weather data is periodically transmitted to the aircraft 100. For example, the weather may be periodically transmitted to the aircraft 100 based on a location of the aircraft 100, a type of weather data to be transmitted to the aircraft 100, an amount of data to be transmitted to the aircraft 100, or based on an identifier associated with the weather data. For example, weather data associated with a particular identifier may be transmitted to the aircraft 100 based on the particular identifier associating the weather data with a location a minimum distance away from the aircraft 100 (e.g., 20 nautical miles, 40 nautical miles, less than 60 nautical miles, over 50 nautical miles) and based on a time that the weather data for the same location was last transmitted to the aircraft 100 (e.g., 30 seconds, 1 minute, 5 minutes, greater than 2 minutes). In one embodiment, the weather data is constantly transmitted to the aircraft 100.

The process 500 further includes acquiring second weather data by controlling an onboard weather radar system (504). For example, in some embodiments, acquiring second weather data includes controlling the operation of a radar antenna (e.g., the antenna 410) of the onboard weather radar system 202 of the aircraft 100 to acquire the weather data from the radar returns. The second weather radar data may be associated with an identifier. In some embodiments, the identifier is similar to the identifiers associated with the first weather data. For example, the second weather data may be associated with an identifier that includes location information (e.g., latitude, longitude, altitude) that identifies the location of a weather condition.

The process 500 further includes correlating the first weather data and second weather data (506). In some embodiments, correlating the first weather data and the second weather data includes determining differences between the data. For example, the first weather data and second weather data may be correlated based on the first weather data and the second weather data relating to different locations (e.g., the first weather data relates to a location 80 nautical miles away from the aircraft 100 while the second weather data does not include weather data for the same location). The process 500 further includes identifying one or more points of interest beyond the range of the onboard weather radar system 202 (508). For example, in one embodiment, weather data relating to threat regions within the effective range of the ground-based radar but beyond the effective range of the antenna 410 of the aircraft 100 is included in the first weather data but not included in the second weather data. In some embodiments, correlating the first weather data and the second weather data includes identifying the points of interest of the first weather data that are not identifiable from the second weather data (e.g., points of interest beyond the range of the onboard weather radar system 202). In some embodiments, the points of interest may generally relate to a particular hazard or threat condition that may impact the operation of the aircraft 100 (e.g., turbulence, lightning, hail).

The process 500 further includes generating weather data for display for the one or more points of interest beyond the range of the onboard weather radar system 202 (510). In some embodiments, generating weather data for display includes displaying second weather data on the display and then supplementing the display with information from the first weather data that highlights the points of interest. For example, the first weather data may be annotated, highlighted, or otherwise identified using stippling, cross-hatching, letters, number, symbols, and colors. In some embodiments, the annotations or highlighted areas may be overlaid over the displayed weather data. In some embodiments, an indication of whether any weather data received from an external weather system (e.g., the terrestrial station 220) is being displayed is provided to the pilot (e.g., via a display, speaker, tactile device). For example, the displayed first weather data may be displayed in a certain color or may be accompanied by a symbol or other indicator (e.g., a text message on screen, a popup message, a highlight) that differentiates the first weather data from the second weather data. In some embodiments, an indicator may be displayed that indicates that no weather data from a source external to the aircraft 100 is being displayed.

Figure 6:
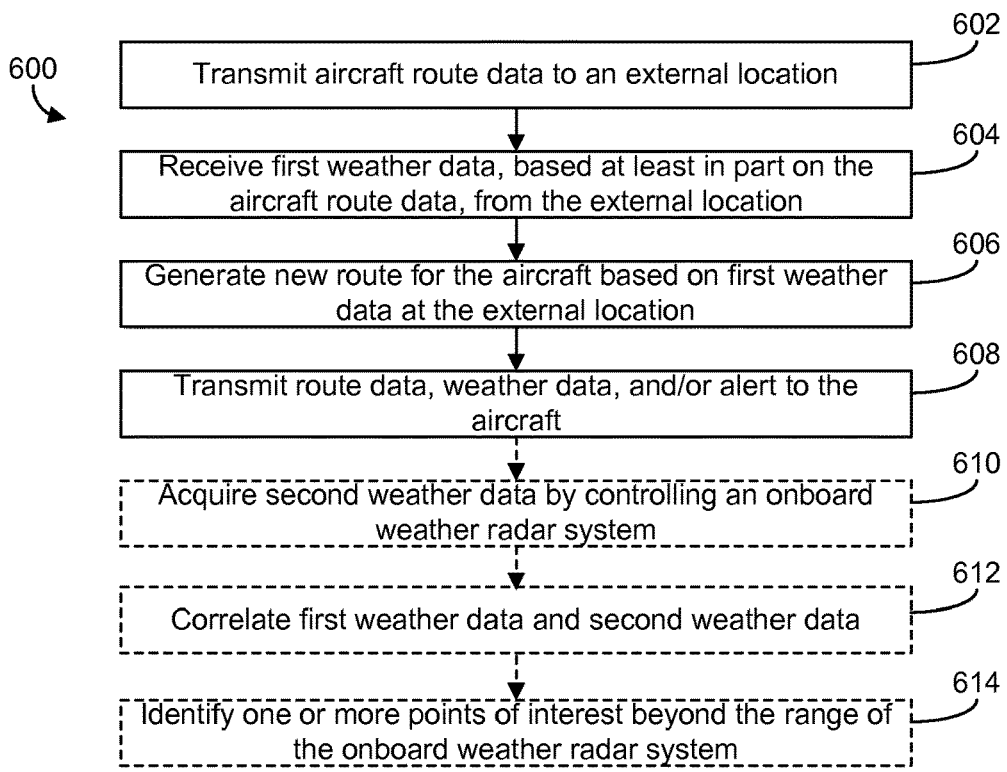
FIG. 6 is a flow diagram of a process for controlling a weather radar control system of an aircraft to generate new route information, according to an exemplary embodiment.

Referring now to FIG. 6, a flow diagram of a process 600 for controlling a weather radar control system of the aircraft 100 to generate new route information is shown according to an exemplary embodiment of the inventive concepts disclosed herein. The process 600 may be implemented using any of the systems and/or apparatuses disclosed herein, for example such as the weather radar system 202. In some embodiments, the process 600 may include determining a new route for the aircraft 100 based on hazards and/or threats detected using weather radar data from a ground-based radar system. In some embodiments, the new route may be based on first weather radar data from a ground-based radar system and second weather radar data from an onboard weather radar system.

The process 600 includes transmitting aircraft route data to an external location (602). The external location may be, for example, the terrestrial station 220, or any other location with a controller that receives radar return data from a ground-based radar system. The aircraft route data may be transmitted using a technique that minimizes the number of transmissions between the aircraft 100 and the external location. For example, the aircraft route data may be transmitted at regular intervals (e.g., 10 seconds, 30 seconds, 2 minutes) or based on particular events (e.g., the aircraft 100 deviating from a flight plan). The aircraft route data may be transmitted using a bus. In some embodiments, the aircraft route data is transmitted using a bus that is currently not being used by the aircraft 100 or is intermittently used by the aircraft 100. For example, the aircraft route data may be transmitted to the external location over an ARINC 429 data bus or Ethernet bus. The aircraft route data may generally include a current location of the aircraft 100 and a programmed route of flight for the aircraft 100.

The process 600 further includes receiving first weather data that may be based at least in part on the aircraft route data (604). In some embodiments, the ground-based radar system may be configured to scan the weather in areas that make up and surround the future flight path location of the aircraft 100, generate first weather data associated with the scanned area, and transmit the first weather data to the aircraft 100. In some embodiments, the ground-based radar system is configured to only scan the weather in areas that make up or surround the future flight path location of the aircraft 100 while not scanning other areas that are beyond those surrounding the future flight path of the aircraft 100. The process 600 further includes generating a new route for the aircraft 100 based on the first weather data (606). In some embodiments, a new route is determined at the external location and then transmitted to the aircraft 100. In some embodiments, a new route is generated by a processor onboard the aircraft 100 after the first weather data is transmitted to the aircraft 100. In some embodiments, a new route is generated only after the first weather data has been correlated with the second weather data and any weather hazards and threats have been detected. For example, a new route that bypasses a severe weather area, as determined based on the first and second weather data, may be generated based on the current route of the aircraft intersecting the severe weather area. The process 600 further includes transmitting the route data, weather data, and/or an alert to the aircraft 100 (608).

The process 600 may further include acquiring second weather data by controlling an onboard weather radar system (610), correlating the first weather data and the second weather data (612), and identifying one or more points of interest beyond the range of the onboard weather radar system (614). For example, the weather radar system of the aircraft 100 may receive the weather data from the external location and then use the weather data to identify weather threats and conditions and to display the identified weather threats and conditions onboard the aircraft 100. In some embodiments, the process 600 may further include receiving input from a pilot of the aircraft 100 to change or update route data, receive confirmation of a change in the route of the aircraft 100, and other data to identify one or more weather threats and weather conditions beyond the range of the antenna 410 of the aircraft 100.

Figure 7A:
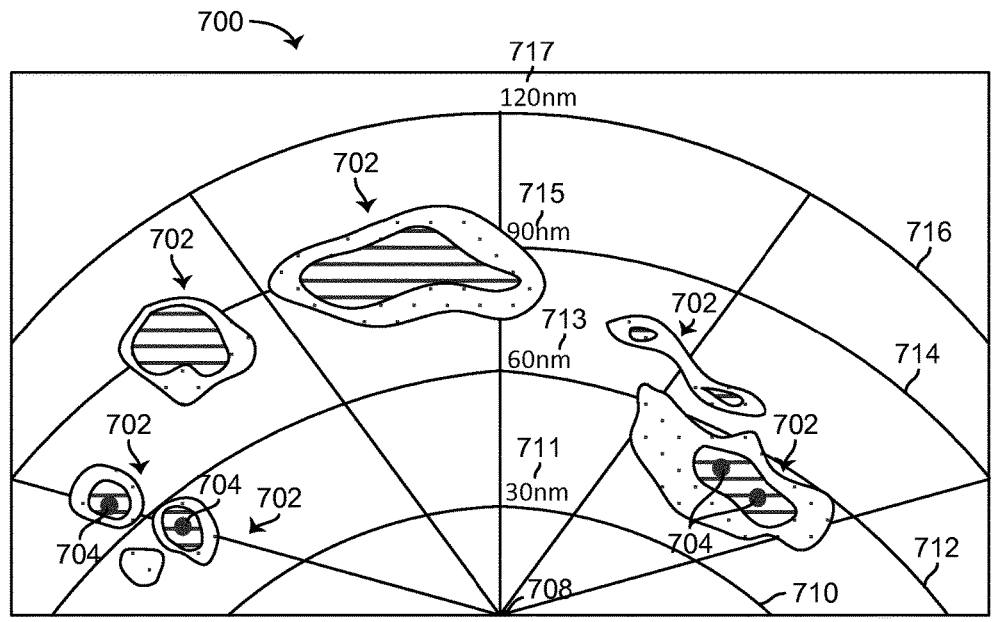
FIGS. 7A-7B are illustrations of display screens for a weather radar display system, according to an exemplary embodiment.
Figure 7B:
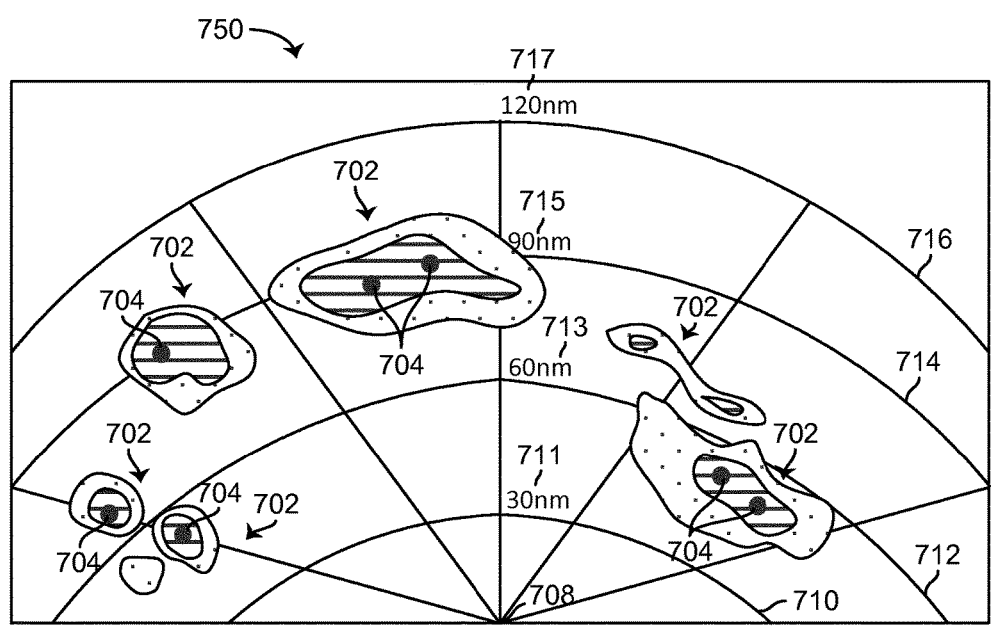

Referring to FIGS. 7A-7B, illustrations of display screens 700, 750 for a weather radar display system are shown according to exemplary embodiments of the inventive concepts disclosed herein. In some embodiments, the display screens 700, 750 may be generated by the electronic display 206 of the aircraft 100 based on weather data received from the weather radar system 202, the communication system 208, and the aircraft sensors 203, and/or data processed by the processing circuit 204. As shown, the display screens 700, 750 include a plurality of weather cells 702 and hazard indicators 704 with respect to a reference point 708 and a plurality of distance rings 710, 712, 714, 716 each associated with a distance indicator 711, 713, 715, 717. In some embodiments, the reference point 708 indicates the location of an aircraft, such as the aircraft 100 having the weather radar system 202.

Each distance ring 710, 712, 714, 716 and distance indicator 711, 713, 715, 717 indicates a distance from the reference point 708. For example, as shown in FIGS. 7A and 7B, distance ring 710 is associated with distance indicator 711, which indicates that distance ring 710 is 30 nautical miles from the reference point 708. In some embodiments, one or more hazard indicators 704 may or may not be located within one or more of the weather cells 702. The hazard indicators 704 may indicate the location of a general weather hazard or a particular weather hazard (e.g., turbulence, lightning, hail). For example, as shown in FIGS. 7A and 7B, a single type of hazard indicator 704 is used to denote the location of weather hazards. In some embodiments, different hazard indicators may be used to differentiate between different hazard types. For example, a first hazard indicator may be used to indicate the location of turbulence, a second hazard indicator may be used to indicate the location of lightning, and a third hazard indicator may be used to indicate the location of hail, and additional hazard indicators may be used to indicate the locations of other weather and non-weather hazards. In some embodiments, a non-weather hazard indicator may indicate the location of a non-weather hazard (e.g., birds, volcanic ash, another aircraft). In some embodiments, the weather cells 702 are displayed only if the weather cells 702 are capable of impacting the ability of the aircraft 100 to traverse the weather cells 702.

Referring specifically to FIG. 7A, the display screen 700 is configured to display weather data generated by the weather radar system 202 (e.g., via processor 402). As shown in FIG. 7A, the display screen 700 may only display weather data acquired from an antenna of an onboard weather radar system (e.g., antenna 410). Accordingly, the information displayed by the display 700 may be indicative of only weather events a certain distance from the aircraft 100. In some embodiments, the weather radar system 202 onboard the aircraft 100 may be configured to acquire different types of weather data at different maximum distances away from the aircraft 100. For example, in some embodiments, the onboard weather radar system 202 is configured to acquire storm cell data up to approximately 100 nm away from the aircraft 100 and is further configured to acquire turbulence data up to 70 nm away from the aircraft 100. As such, the display screen 700 is configured to display weather cells 702, corresponding to the storm cell data, up to approximately 100 nm away from the aircraft 100 and hazard indicators 704, corresponding to the turbulence data, up to 70 nm away from the aircraft 100. Accordingly, in some embodiments, the information displayed on the display screen 700 may be limited by the maximum distance that the onboard weather radar system is able to acquire data. The weather radar system 202 of the aircraft 100 may be configured to detect different types of hazards up to a particular maximum distance (e.g., lightning up to 160 nm away). As shown in FIG. 7A, no hazard indicators 704 are displayed on the display screen 700 beyond a threshold distance (e.g., no hazard indicators are shown beyond 70 nm away from the reference point 708).

Referring specifically to FIG. 7B, the display screen 750 is configured to display weather data generated by the weather radar system 202 (e.g., via processor 402). In some embodiments, the weather radar system 202 is configured to receive first weather radar data from an external source (e.g., a ground based station such as terrestrial station 220) and correlate the first weather radar data with second weather radar data that is acquired from a weather radar system onboard the aircraft 100 before displaying the correlated weather radar data on the display screen 750. The correlated weather radar data may be indicative of weather events a further distance from the aircraft 100 than if the weather radar system 202 only relied on weather data obtained using the weather antenna 410 onboard the aircraft 100. For example, in some embodiments, the onboard weather radar system 202 is configured to acquire second weather data that includes storm cell data up to approximately 100 nm away from the aircraft 100 and turbulence data up to 70 nm away from the aircraft 100, and second weather data that includes turbulence data up to 100 nm away from the aircraft 100. As such, the display screen 700 is configured to display weather cells 702, corresponding to the storm cell data, up to approximately 100 nm away from the aircraft 100 and hazard indicators 704, corresponding to the turbulence data, up to 100 nm away from the aircraft 100. In some embodiments, the weather radar system 202 obtains first weather radar data from an external source based on second weather data from an onboard source (e.g., the antenna 410) or second weather radar data from an onboard source based on first weather radar data from an external source. In some embodiments, the first weather data is received before the second weather data, the second weather data is received before the first weather data, or the first and second weather data is received simultaneous. For example, in some embodiments, the first weather radar data is received based on a maximum range of the onboard weather radar antenna and/or to fill in data for weather events beyond the range of the antenna 410 but within a desirable display range (e.g., first weather data is received up to 100 nm away from the aircraft 100 if the weather antenna 410 has a maximum range of less than 100 nm, first weather data is received in an area 70 nm away from the aircraft 100 to 100 nm away from the aircraft 100 based on the antenna 410 having a range of 70 nm). By receiving external weather data only for areas that are beyond the range of the antenna 410, but not overlapping areas within range of the antenna 410, the weather radar system 210 can increase processing speeds and require less time and bandwidth to send data to and receive data from an external source. In some embodiments, weather radar data is received from an external source for a particular area based on a user input, a flight plan, and/or a current or future flight path of the aircraft 100. In some embodiments, the weather data obtained by the external weather radar system is processed on the ground before being transmitted to the aircraft 100. For example, the external weather radar system may process the external weather radar data based on a component of the onboard weather radar system 202 so that the external weather radar data may be displayed on the display screen 750 without being further processed or manipulated by the onboard weather radar system 202. In some embodiments, the pilot of the aircraft 100 may toggle between displaying only external weather radar data, only weather radar data obtained by the antenna 410 of the aircraft 100, or both external weather radar data and weather radar data obtained by the antenna 410. In some embodiments, a message or indicator may appear on the display screen 750 indicating the data source for the information displayed on the display screen 750. For example, the display screen 750 may display a message reading "No external data displayed" if no external data is currently being displayed. In some embodiments, only data that supplements or extends the range of weather data obtained by antenna 410 is transmitted to the aircraft from the external source. In some embodiments, other information is displayed on the display screen 750, including a new route for the aircraft 100 based on the presence of the weather cells 202 and/or hazard indicators 704.

The inventive concepts disclosed herein are described with reference to drawings. These drawings illustrate certain details of specific embodiments that implement the systems, methods, and programs of the inventive concepts disclosed herein. However, describing the inventive concepts disclosed herein with drawings should not be construed as imposing on the inventive concepts any limitations that may be present in the drawings. The inventive concepts disclosed herein contemplate methods, systems and program products on machine-readable media capable of accomplishing its operations. No claim element herein is to be construed under the provisions of 35 U.S.C. § 112, sixth paragraph, unless the element is expressly recited using the phrase "means for." Further, no element, component, or method step in the present disclosure is intended to be dedicated to the public, regardless of whether the element, component or method step is explicitly recited in the claims.

Some embodiments of the disclosure are described in the general context of method steps which may be implemented in one embodiment by a program product including machine-executable instructions, such as program code, for example, in the form of program modules executed by machines in networked environments. The program modules may include routines, programs, objects, components, and data structures that perform particular tasks or implement particular data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments may use computer networks, intranets, and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It should be noted that although the flowcharts and diagrams provided herein may show a specific order of method steps, it is understood that the order of these steps may differ from what is depicted. Also two or more steps may be performed concurrently or with partial concurrence. Such variation may depend on the software and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A weather radar control system, comprising:
    at least one processor coupled with a communication system and a non-transitory processor-readable medium storing processor-executable code for causing the at least one processor to:
        acquire first weather data from a weather radar system onboard an aircraft, the first weather data including a first location of a first type of weather event in a first area extending from the aircraft and a second location of the first type of weather event in a second area, wherein the second area is within the weather radar system's detection range for detecting the first type of weather event;
        receive second weather data for the second area with respect to the aircraft via the communication system from an external location, the second weather data including a location of a second type of weather event in the second area, wherein the second area is beyond the weather radar system's detection range for detecting the second type of weather event;
        correlate the first weather data and the second weather data based on the first and second locations;
        generate display data for display based on the correlated weather data, wherein the display data is for a display area at least partially defined by the first and second areas; and
        provide the display data to a display system onboard the aircraft.

2. The weather radar control system of claim 1, wherein the second area includes at least a portion of the first area.

3. The weather radar control system of claim 2, wherein the second area includes the first area.

4. The weather radar control system of claim 1, wherein the first area extends to a first distance from the aircraft, and wherein the second area extends to a second distance from the aircraft.

5. The weather radar control system of claim 1, wherein the first area extends to a first distance from the aircraft, and wherein the second area begins at the first distance from the aircraft and extends to a second distance from the aircraft.

6. The weather radar control system of claim 5, wherein the first distance defines a maximum detection distance of the weather radar system onboard the aircraft for at least one of a particular type of weather event or a particular type of non-weather event.

7. The weather radar control system of claim 6, wherein the particular type of weather event includes at least one of convective activity, lightning, icing levels, wind shear, and turbulence, and wherein the particular type of non-weather event includes at least one of volcanic ash, birds, and an identified aircraft.

8. The weather radar control system of claim 1, wherein the first area extends to a first distance from the aircraft and the second area begins at a distance intermediate to the aircraft and the first distance and extends to a second distance from the aircraft.

9. The weather radar control system of claim 1, wherein the non-transitory processor-readable medium further stores processor-executable code for causing the at least one processor to transmit, via the communication system, route information of the aircraft to the external location, wherein at least one processor at the external location is configured to generate the second weather data based on the route information.

10. A weather radar control system, comprising:
    a communication system including a transmitter-receiver configured to receive weather data from an external location; and
    at least one processor coupled with the communication system and a non-transitory processor-readable medium storing processor-executable code for causing the at least one processor to:
        acquire first weather data from a weather radar system onboard an aircraft, the first weather data including a first location of a first type of weather event in a first area extending from the aircraft and a second location of the first type of weather event in a second area, wherein the second area is within the weather radar system's detection range for detecting the first type of weather event;
        receive second weather data for the second area with respect to the aircraft different from the first area from the external location based on a range of the first area extending from the aircraft, the second weather data including a location of a second type of weather event in the second area, wherein the second area is beyond the weather radar system's detection range for detecting the second type of weather event;
        correlate the first weather data and the second weather data based on the first and second locations;
        generate display data for display based on the correlated weather data, wherein the display data is for a display area at least partially defined by at least one of the first and second areas; and
        provide the display data to a display system onboard the aircraft.

11. The weather radar control system of claim 10, wherein the first area extends to a first distance from the aircraft and the second area begins at the first distance from the aircraft and extends to a second distance from the aircraft.

12. The weather radar control system of claim 11, wherein the first distance defines a maximum detection distance of the weather radar system onboard the aircraft for a particular type of weather event.

13. The weather radar control system of claim 12, wherein the particular type of weather event includes at least one of convective activity, lightning, icing levels, wind shear, and turbulence.

14. The weather radar control system of claim 10, wherein the generated display data includes an identifier that identifies the source of at least one of the first weather data and the second weather data.

15. The weather radar control system of claim 14, wherein the non-transitory processor-readable medium further stores processor-executable code for causing the at least one processor to selectively generate the display data using either the first weather data or the second weather data based on a user input.

16. A method of controlling a weather radar control system, comprising:

acquiring first weather data from a weather radar system onboard an aircraft, the first weather data including a first location of a first type of weather event in a first area extending from the aircraft and a second location of the first type of weather event in a second area, wherein the second area is within the weather radar system's detection range for detecting the first type of weather event;

receiving second weather data for the second area with respect to the aircraft via a communication system from an external location, the second weather data including a location of a second type of weather event in the second area, wherein the second area is beyond the weather radar system's detection range for detecting the second type of weather event;

correlating the first weather data and the second weather data based on the first and second locations;

generating display data for display based on the correlated weather data, wherein the display data is for a display area at least partially defined by the first and second areas; and providing the display data to a display system onboard the aircraft.

17. The method of claim 16, wherein the first area extends to a first distance from the aircraft, and wherein the second area begins at the first distance from the aircraft and extends to a second distance from the aircraft.

18. The method of claim 17, wherein the first distance defines a maximum detection distance of the weather radar system onboard the aircraft for a particular type of weather event.

19. The method of claim 18, wherein the particular type of weather event includes at least one of convective activity, lightning, icing levels, wind shear, and turbulence.

20. The method of claim 16, further comprising transmitting, via the communication system, route information of the aircraft to the external location, wherein at least one processor at the external location generates the second weather data based on the route information.

* * * * *